(12) United States Patent
Tsuruma

(10) Patent No.: US 11,967,894 B2
(45) Date of Patent: Apr. 23, 2024

(54) POWER CONVERTER

(71) Applicant: TOSHIBA MITSUBISHI-ELECTRIC INDUSTRIAL SYSTEMS CORPORATION, Chuo-ku (JP)

(72) Inventor: Yoshinori Tsuruma, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 64 days.

(21) Appl. No.: 17/906,018

(22) PCT Filed: Mar. 5, 2021

(86) PCT No.: PCT/JP2021/008642
§ 371 (c)(1),
(2) Date: Sep. 9, 2022

(87) PCT Pub. No.: WO2022/185519
PCT Pub. Date: Sep. 9, 2022

(65) Prior Publication Data
US 2023/0058969 A1 Feb. 23, 2023

(51) Int. Cl.
*H02M 1/36* (2007.01)
*H02M 7/537* (2006.01)

(52) U.S. Cl.
CPC .............. *H02M 1/36* (2013.01); *H02M 7/537* (2013.01)

(58) Field of Classification Search
CPC ................................. H02M 1/36; H02M 7/537
(Continued)

(56) References Cited

U.S. PATENT DOCUMENTS

2014/0339890 A1* 11/2014 Wolff ..................... B60L 3/04
307/9.1
2016/0226256 A1* 8/2016 Falk ...................... H02J 3/381
(Continued)

FOREIGN PATENT DOCUMENTS

JP 10-243660 A 9/1998
JP 2003-189633 A 7/2003
(Continued)

OTHER PUBLICATIONS

International Search Report and Written Opinion dated May 18, 2021 in PCT/JP2021/008642 filed on Mar. 5, 2021 (total 13 pages).
(Continued)

*Primary Examiner* — William Hernandez
(74) *Attorney, Agent, or Firm* — Oblon, McClelland, Maier & Neustadt, L.L.P.

(57) ABSTRACT

A power converter includes: plural inverter units connected in parallel to a DC power supply, including a storage battery, on a DC side and a DC fuse in each of current paths between the DC power supply and the inverter units, the DC fuse configured to, when a short-circuit failure occurs in any of the inverter units, be blown in the current path between the DC power supply and the inverter unit having the short-circuit failure. The number of the inverter units is a number with which a condition that, when the DC fuse between the DC power supply and the inverter unit having the short-circuit failure is blown, none of a plurality of the DC fuses between the DC power supply and a plurality of other inverter units that do not have the short-circuit failure are blown is satisfied.

1 Claim, 8 Drawing Sheets

(58) Field of Classification Search
USPC ............ 307/31; 363/55, 56.01, 56.02, 56.03,
363/56.04, 123, 131, 132
See application file for complete search history.

(56) References Cited

U.S. PATENT DOCUMENTS

| | | | |
|---|---|---|---|
| 2016/0322917 A1* | 11/2016 | Matsuoka | ............... H02M 1/32 |
| 2017/0012549 A1* | 1/2017 | Abe | .................... H02M 3/1588 |
| 2019/0214811 A1* | 7/2019 | Nishimura | .............. H02M 1/32 |
| 2020/0336077 A1* | 10/2020 | Nishimura | .............. H02J 9/062 |
| 2022/0052549 A1* | 2/2022 | Lee | ......................... H02J 9/066 |
| 2022/0115902 A1* | 4/2022 | Park | ......................... H02J 9/06 |
| 2022/0399800 A1* | 12/2022 | Liu | ....................... H02M 7/537 |

FOREIGN PATENT DOCUMENTS

| | | |
|---|---|---|
| JP | 2007-74823 A | 3/2007 |
| JP | 2017-221008 A | 12/2017 |

OTHER PUBLICATIONS

International Preliminary Report on Patentability and Written Opinion dated Sep. 14, 2023, in PCT/JP2021/008642, 7 pages.
Office Action dated May 30, 2023, in corresponding Japanese Patent Application No. 2022-535169 (with English Translation), 8 pages.

* cited by examiner

FIG. 7

| Body Size | Ampere Rating $I_n$ (A) | Rated Voltage $V_n$ (V) (IEC) | Melting $I^2t$ ($A^2s \times 10^3$) | Total Clearing $I^2t$ @$V_n$ ($A^2s \times 10^3$) | Watts Loss @$I_n$ (W) |
|---|---|---|---|---|---|
| 30 | 200 | 690 | 3 | 16.7 | 43 |
| | 400 | 690 | 23 | 130 | 65 |

FIG. 9
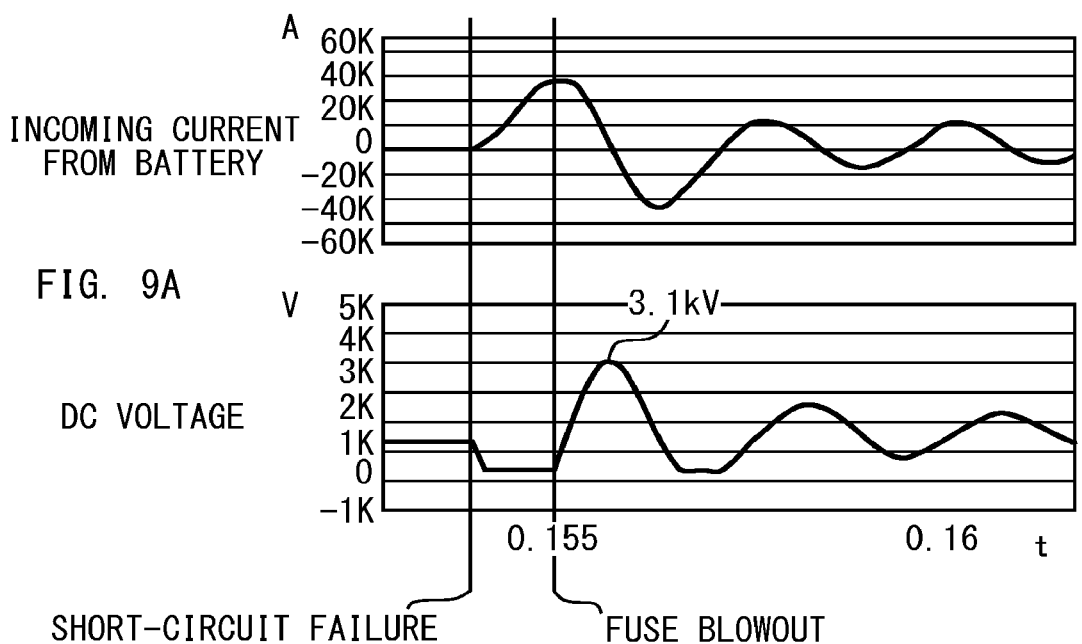
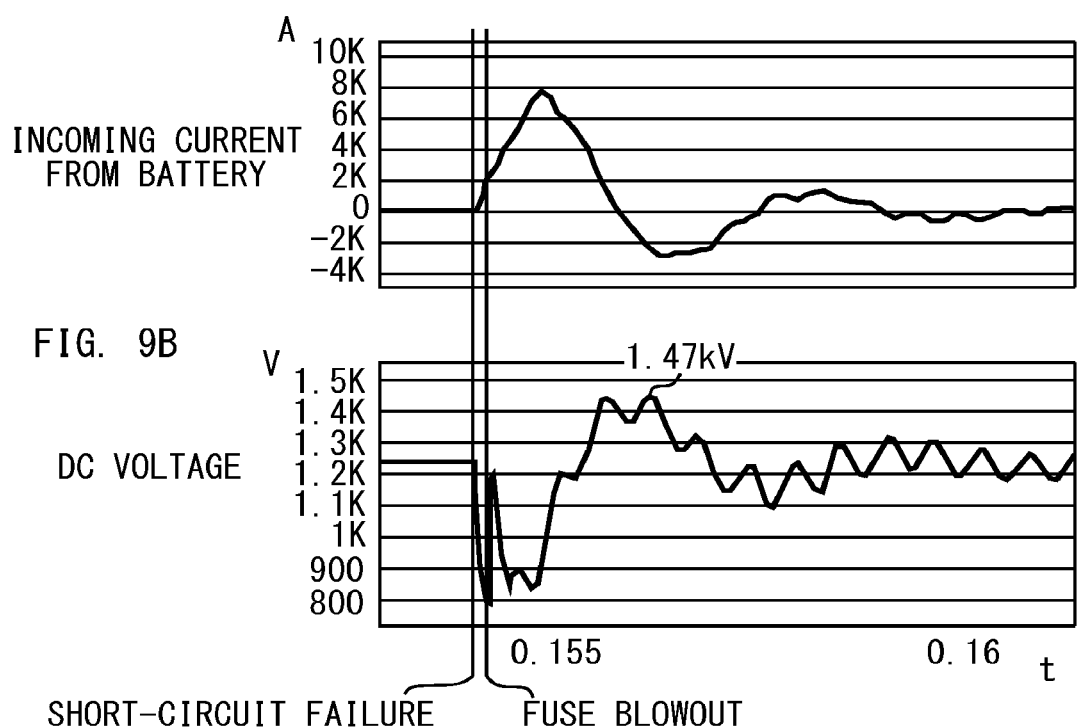

POWER CONVERTER

BACKGROUND

There is known a conventional power converter in which a plurality of inverter units that convert DC power to AC power are connected in parallel to increase the capacity of the power converter. Further, in achieving such a conventional large-capacity power converter including a plurality of inverter units connected in parallel, the capacity of each inverter unit is increased and the number of inverter units is minimized to, for example, save labor in wiring.

There is known a protection method using a DC fuse which is provided to interrupt current when a short-circuit failure, such as device breakage, occurs in a device inside each of the inverter units which are connected in parallel in this manner in such a power converter (e.g., refer to PTL 1).

CITATION LIST

Patent Literature

[PTL 1] JP 2007-074823 A

SUMMARY

Technical Problem

However, in a case where the capacity of the DC fuse is too large, even if the DC fuse is blown, the blowout timing is delayed, which increases rise of a DC link voltage (DC voltage input to the inverter). If the degree of the rise of the DC link voltage largely exceeds a withstand voltage of the device, secondary device breakage occurs also in a sound inverter unit.

Thus, it is an object of the present invention to provide a power converter that reduces the occurrence of secondary device breakage in a sound inverter unit by immediately blowing a DC fuse when device breakage occurs to suppress rise of a DC link voltage.

Solution to Problem

A power converter according to one aspect of the present invention includes: a plurality of inverter units connected in parallel to a DC power supply on a DC side, the DC power supply including a storage battery, each of the plurality of inverter units including a plurality of semiconductor devices; and a DC fuse provided in each of current paths between the DC power supply and the plurality of inverter units, the DC fuse being configured to, when a short-circuit failure occurs in any of the plurality of inverter units, be blown in the current path between the DC power supply and the inverter unit having the short-circuit failure, in which the number of the plurality of inverter units is a number with which a condition that, when the DC fuse between the DC power supply and the inverter unit having the short-circuit failure is blown, none of a plurality of the DC fuses between the DC power supply and a plurality of other inverter units that do not have the short-circuit failure are blown is satisfied.

In the power converter of the above aspect, the number of the plurality of inverter units may be larger than the number of the plurality of the semiconductor devices.

In the power converter of the above aspect, the number of the plurality of inverter units may be larger than 4.

Advantageous Effects of Invention

According to the present invention, it is possible to provide a power converter that reduces the occurrence of secondary device breakage in a sound inverter unit by immediately blowing a DC fuse when device breakage occurs to suppress rise of a DC link voltage.

BRIEF DESCRIPTION OF DRAWINGS

FIG. 7 is a diagram illustrating examples of a DC fuse rating.

FIG. 9 is a diagram illustrating an operation example of direct current and DC voltage at the occurrence of a short-circuit failure in the conventional power converter according to the comparative example illustrated in FIG. 8 and an operation example of direct current and DC voltage at the occurrence of a short-circuit failure in the power converter according to the embodiment.

DESCRIPTION OF EMBODIMENTS

Hereinbelow, an embodiment of a power converter according to the present invention will be described with reference to the drawings.

Embodiment

Figure 1:
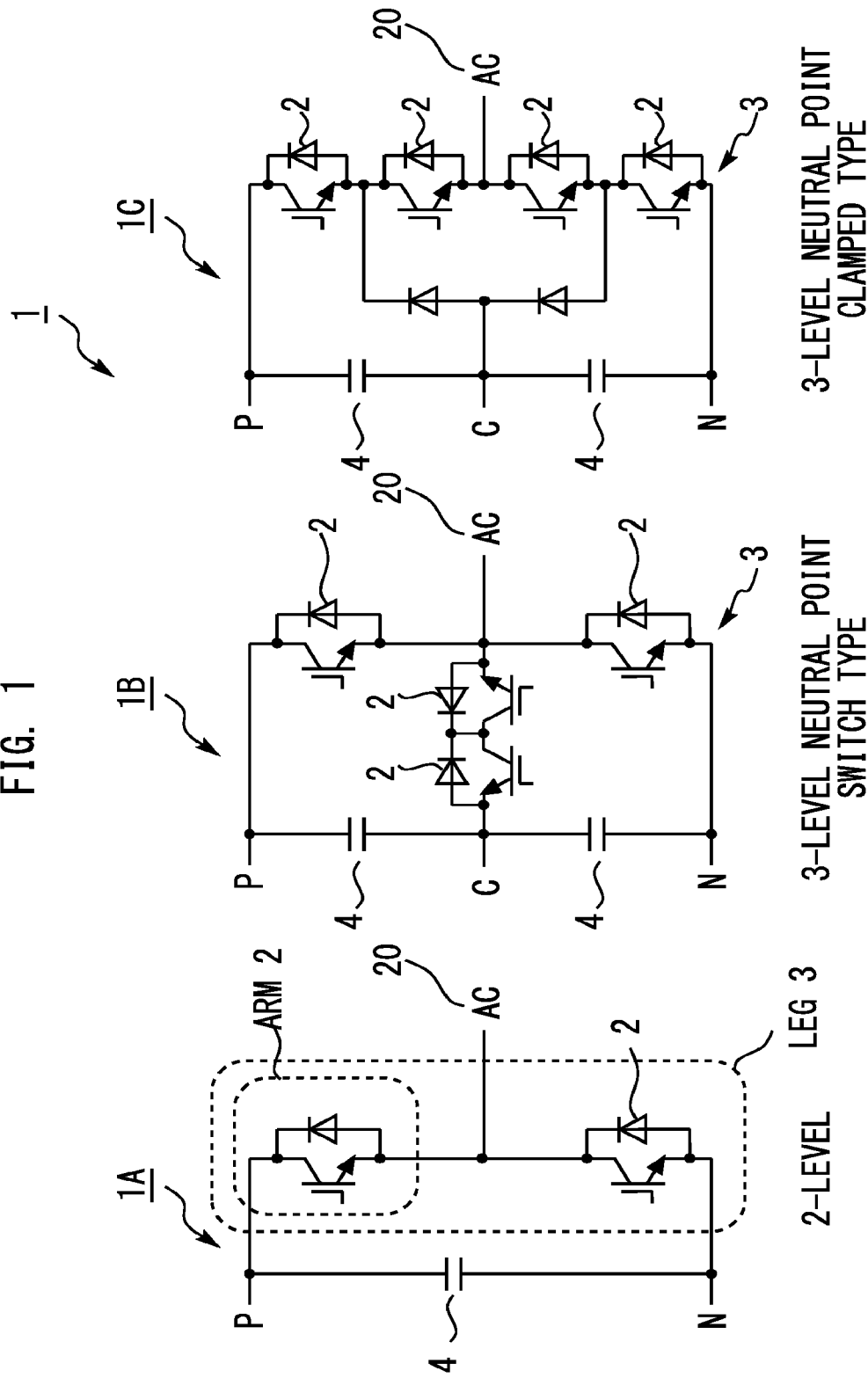
FIG. 1 is a diagram illustrating configuration examples of a power converter according to an embodiment.

FIG. 1 is a diagram illustrating configuration examples of a power converter 1 according to an embodiment. FIG. 1A is a diagram illustrating a configuration example of a 2-level power converter 1A, FIG. 1B is a diagram illustrating a configuration example of a 3-level neutral point switch type power converter 1B, and FIG. 1C is a diagram illustrating a configuration example of a 3-level neutral point clamped type power converter 1C.

For example, the 2-level power converter 1A in FIG. 1A includes a positive electrode P and a negative electrode N on a DC side. Each of the 3-level neutral point switch type power converter 1B in FIG. 1B and the 3-level neutral point clamped type power converter 1C in FIG. 1C includes a positive electrode P, a negative electrode N, and a neutral point C on a DC side. The positive electrode P, the negative electrode N, and the neutral point C are connected to a DC power supply 10 (refer to FIG. 2) through a current path (DC bus). Note that the DC power supply 10 (refer to FIG. 2) in the present embodiment is a storage battery. Thus, hereinbelow, the DC power supply 10 may also be referred to as the storage battery 10.

Note that the present invention can be applied to any of the power converters 1A, 1B, and 1C in the present embodiment. Hereinbelow, in the present embodiment, the power converters 1A, 1B, and 1C are collectively referred to as the power converter 1 or the inverter 1. The power converter 1 is connected to an AC system 20 from an AC terminal through, for example, a harmonic filter (not illustrated).

The 2-level power converter 1A in FIG. 1A will be described as an example. The power converter 1 includes an arm 2, a leg 3, and a capacitor 4. The arm 2 refers to each separate element in a bridge circuit. The leg 3 indicates a part where a pair of upper and lower arms 2 are connected in series between the positive electrode and the negative electrode on the DC side. Note that although a single-phase full bridge circuit includes two arms (one leg) or four arms (two legs) and a three-phase full bridge circuit includes six arms (three legs), the number of phases is not limited to any number in the present invention. In FIG. 1A, the power converter 1 passes a sinusoidal current to an AC side through alternate switching of the upper and lower arms 2.

The capacitor 4 absorbs a ripple current generated through the alternate switching of the upper and lower arms 2 to avoid burden on the DC power supply 10 side. Note that the 3-level neutral point switch type power converter 1B in FIG. 1B and the 3-level neutral point clamped type power converter 1C in FIG. 1C also have a configuration similar to that of the 2-level power converter 1A in FIG. 1A.

Figure 2:
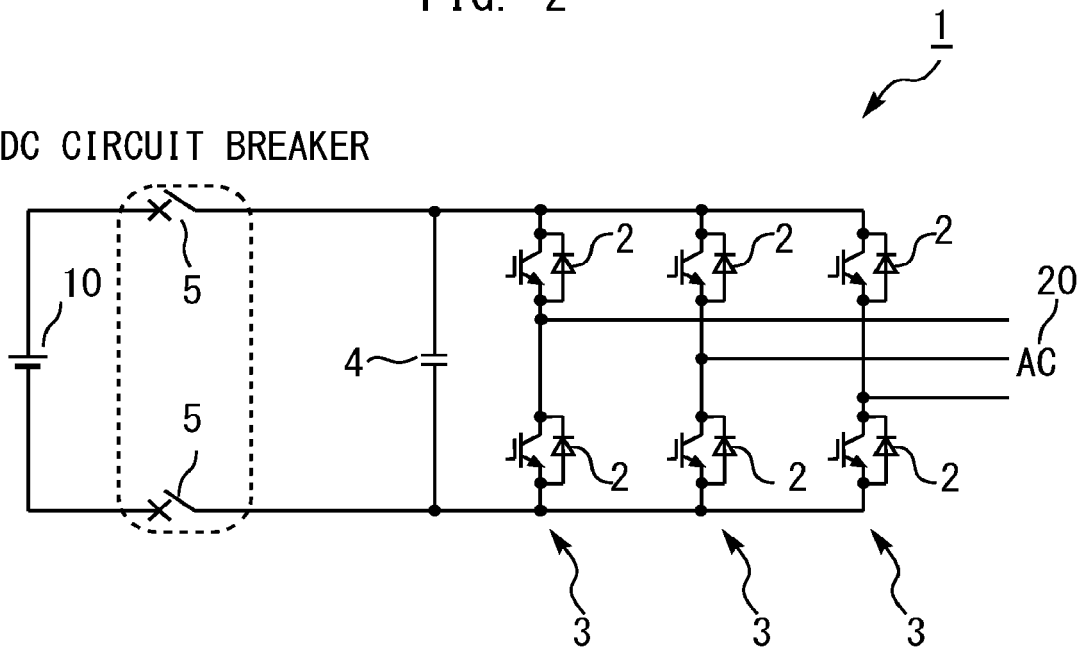
FIG. 2 is a diagram illustrating an example of DC circuit protection using a DC circuit breaker.

FIG. 2 is a diagram illustrating an example of DC circuit protection using a DC circuit breaker. In FIG. 2, the power converter 1 includes three-phase legs 3, and is connected to the DC power supply (storage battery) 10 on the DC side and connected to the AC system 20 on the AC side. Note that the power converter 1 in the present embodiment is a voltage type inverter.

Typically, in the power converter 1, which is the voltage type inverter, a control system is set so that the upper arm 2 and the lower arm 2 in the drawing are not simultaneously turned on. This is because, if the upper and lower arms 2 are simultaneously turned on, an PN short circuit (a short circuit between the positive electrode side and the negative electrode side) may occur, which may result in device breakage. However, a device may break due to an accidental failure in a semiconductor, a malfunction caused by noise, or the like. For example, if a short-circuit failure occurs in the upper arm 2 when the leftmost lower arm 2 in the drawing is switching, an PN short circuit occurs. If this state is left untreated, excessive current continuously flows into a short-circuit point from the DC power supply 10, and excessive current also flows through the lower arm 2 that is soundly switching, which causes a failure. If the failure is further left untreated, more current flows in, and the failure may spill over to another part or there may be a risk of fire or smoke. Thus, the power converter 1 requires protection for a DC circuit.

First, it is considered that, as illustrated in FIG. 2, a DC circuit breaker 5 is provided between the storage battery 10 and the power converter 1 in the DC circuit to isolate a short-circuit point from the storage battery 10 using the DC circuit breaker 5 when an PN short circuit occurs. Note that the DC circuit breaker 5 is opening and closing means capable of interrupting a fault current. The DC circuit breaker 5 can isolate the short-circuit point from the storage battery 10 by detecting the fault current caused by the short-circuit failure and opening and closing the current path (bus).

However, a high-voltage DC circuit breaker 5 of, for example, a 1500 V or higher class is highly expensive, and even in that case, it is extremely large. Thus, although protection means for the DC circuit using the DC circuit breaker 5 is employed in a 1000 V or lower class, protection means for the DC circuit using the DC circuit breaker 5 is typically not employed, for example, in a high-voltage class of 1500 V or higher. Thus, for example, in the case of a high-voltage class of 1500 V or higher, means for isolating a short-circuit point from the other sound circuit using a DC fuse 6 (refer to FIG. 3) provided in the DC circuit is employed.

Figure 3:
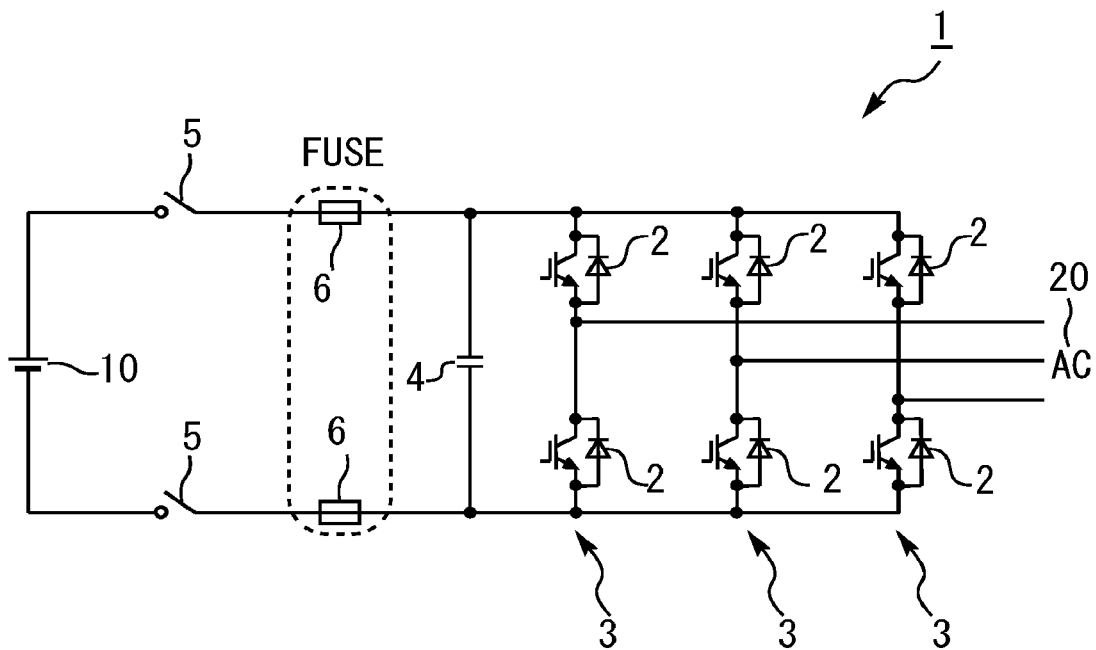
FIG. 3 is a diagram illustrating an example of DC circuit protection using a DC fuse.

FIG. 3 is a diagram illustrating an example of DC circuit protection using a DC fuse. As illustrated in FIG. 3, in protecting the DC circuit using the DC fuse, the DC fuse 6 is provided at each of an entrance of the positive electrode P side and an entrance of the negative electrode N side. Typically, as the DC fuse 6, a DC fuse with an ampere rating that has a predetermined margin so as to prevent unnecessary blowout in an operation at a rated current and that reliably causes blowout at a fault current is selected.

For example, even if a short-circuit failure occurs in the upper and lower arms 2, the DC fuse 6 as described above is blown by the fault current and thus can isolate a fault point from the storage battery 10. On the other hand, even when the DC fuse 6 as described above is operated at the rated current, unnecessary blowout, malfunction, or the like does not occur. Thus, for example, in the case of a high-voltage class of 1500 V or higher, the means for isolating a short-circuit point from the other sound circuit using the DC fuse 6 provided in the DC circuit is employed.

Figure 4:
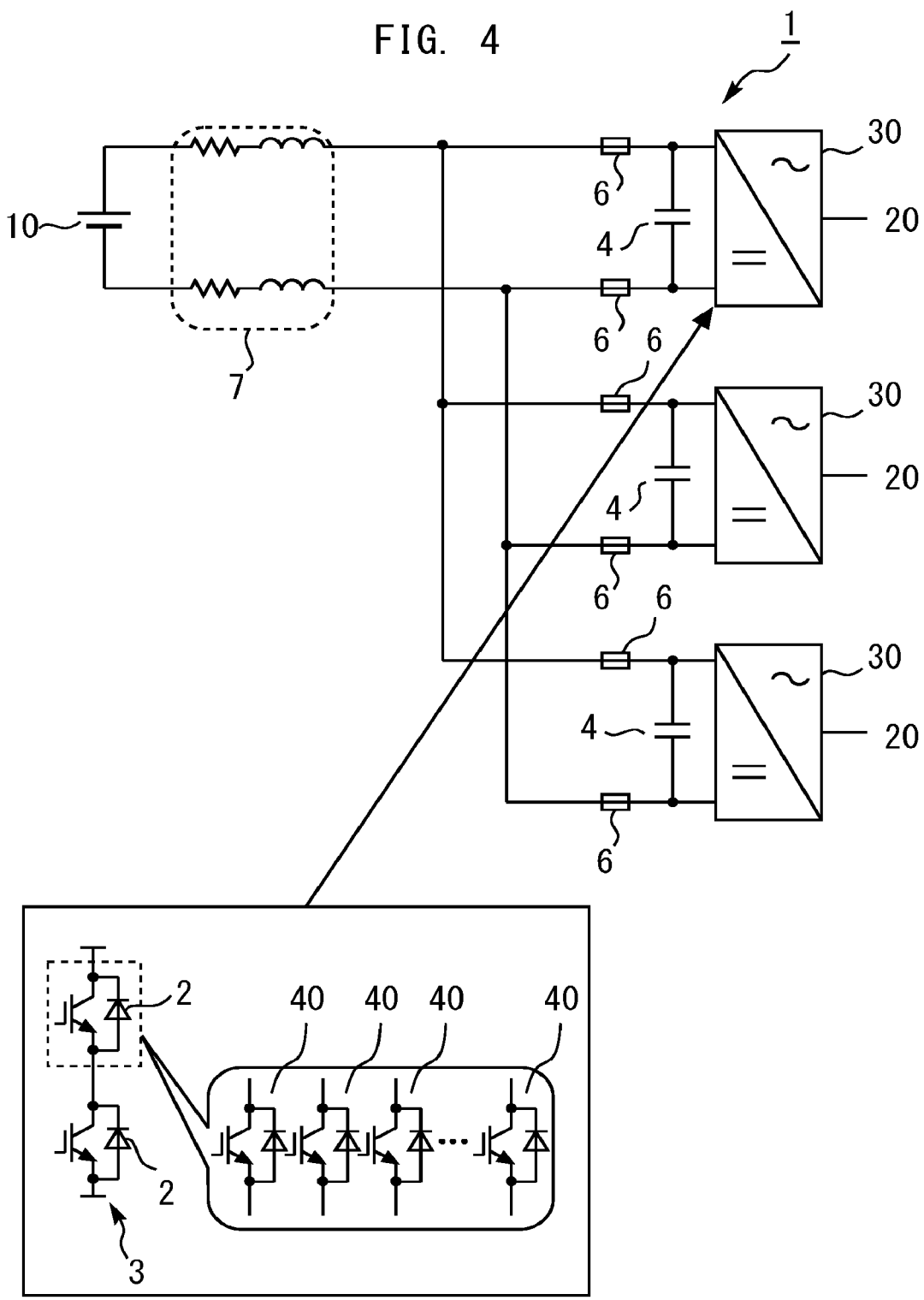
FIG. 4 is a diagram for describing an example of increasing the capacity of the power converter.

FIG. 4 is a diagram for describing an example of increasing the capacity of the power converter 1. In FIG. 4, in the power converter 1, three inverter units 30 are connected in parallel to the storage battery 10. As illustrated in the lower part of FIG. 4, in each of the inverter units 30, a plurality of semiconductor devices 40 are connected in parallel in each arm 2 (each leg 3). Note that a reference sign 7 denotes an internal impedance (e.g., an LR component) of the storage battery 10. Here, a large capacity is not based on a numerical value criterion and means a capacity that can only be achieved by connecting a plurality of semiconductor devices 40 in parallel.

Assuming that a power converter 1 of a certain basic design is present, in order to achieve a power converter 1 having a larger capacity than the power converter 1 of the basic design (that is, capable of performing larger power conversion than the power converter 1 of the basic design), it is conceivable to increase voltage or current. However, in storage battery equipment, increase of voltage is typically achieved by connecting a large number of single battery cells in series and parallel, which depends on design made by each battery manufacturer. That is, since one battery cannot pass a current of hundreds of volts and thousands of amperes, the method that increases voltage is often achieved by packing and connecting a large number of small single battery cells in the unit of several amperes in series and parallel. Further, due to a problem of withstand voltage, it is not possible to infinitely increase voltage.

On the other hand, in the method that increases current, the number of inverters connected in parallel may be increased. Thus, compared to the method that increases voltage, it is possible to easily construct the large-capacity power converter 1. In order to employ this method, it is considered that a large number of power converters 1 having the same configuration are installed in parallel or the single unit capacity of the power converter 1 is increased. Further, in order to increase the single unit capacity of the power converter 1, a method that uses a semiconductor device 40 having a larger ampere rating than a basic semiconductor device 40 or a method that connects a large number of semiconductor devices 40 in parallel can be considered. However, there is a limit to the method using the semiconductor device 40 having a large ampere rating. Thus, the method that connects a large number of semiconductor devices 40 in parallel is employed. That is, this method is a method that connects a large number of semiconductor devices 40 in parallel to constitute one switch. However, if the number of semiconductor devices 40 is excessively increased, cooling means (e.g., a fin) is upsized, which deteriorates manufacturability and maintainability.

Thus, it is also not possible to infinitely increase the number of semiconductor devices 40. Therefore, discrete inverter units 30 (discrete units 30) each having a larger capacity than the typical inverter unit 30 to some extent may be mounted in parallel within a board. Further, in a case where such a power converter 1 that includes a plurality of discrete inverter units 30 connected in parallel and has a larger capacity than the power converter 1 of the basic design (also merely referred to as "large-capacity power converter 1") is used, protection for the DC circuit is performed using the DC fuse 6 as described above.

Figure 5:
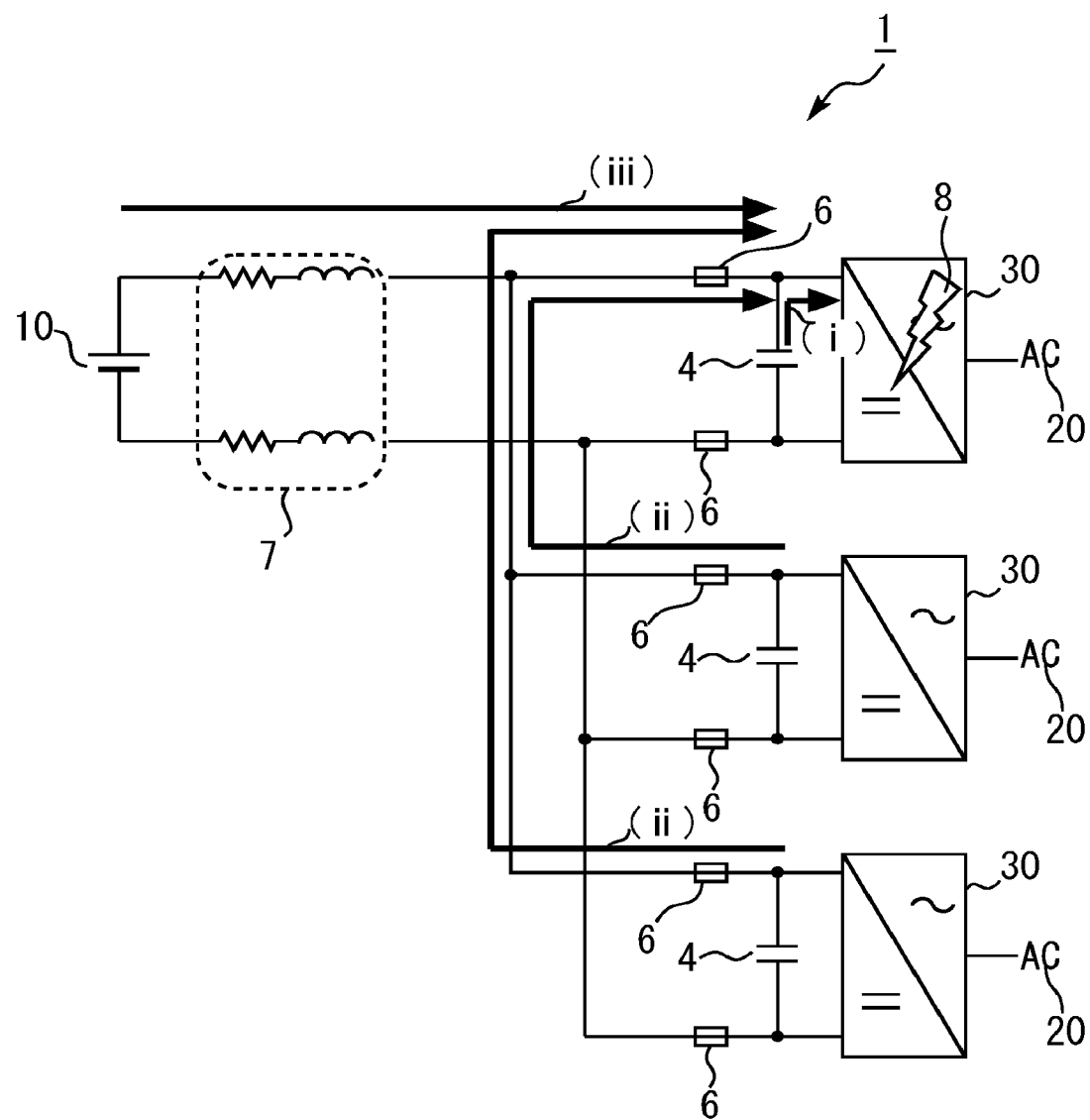
FIG. 5 is a diagram illustrating an operation example of the large-capacity power converter illustrated in FIG. 4 at the time of a failure.

FIG. 5 is a diagram illustrating an operation example of the large-capacity power converter 1 illustrated in FIG. 4 at the time of a failure. In FIG. 5, the uppermost inverter unit 30 in the drawing has a PN short-circuit failure 8. When the short-circuit failure 8 occurs in the uppermost inverter unit 30, currents indicated by (i), (ii), and (iii) in the drawing flow into a fault point. The current of (i) is a current flowing in from the DC capacitor 4 of the inverter unit 30 having the short-circuit failure 8. The current of (ii) is a current flowing in from the DC capacitor 4 of an adjacent sound inverter unit 30. The current of (iii) is a current flowing in from the storage battery 10.

As illustrated in FIG. 5, the current indicated by (i) does not pass through the DC fuse 6 of the inverter unit 30 having the short-circuit failure 8 and thus does not contribute to blowout of the DC fuse 6. Further, the current indicated by (iii) rises more slowly than the current of (i) and the current of (ii) due to the influence of wiring between the storage battery 10 and the power converter 1 or the internal impedance (LR component) 7 of the storage battery 10. Thus, typically, in the large-capacity power converter 1 including the plurality of inverter units connected in parallel, the DC fuse 6 of the inverter unit 30 having the short-circuit failure is blown basically using the current of (ii).

Figure 6:
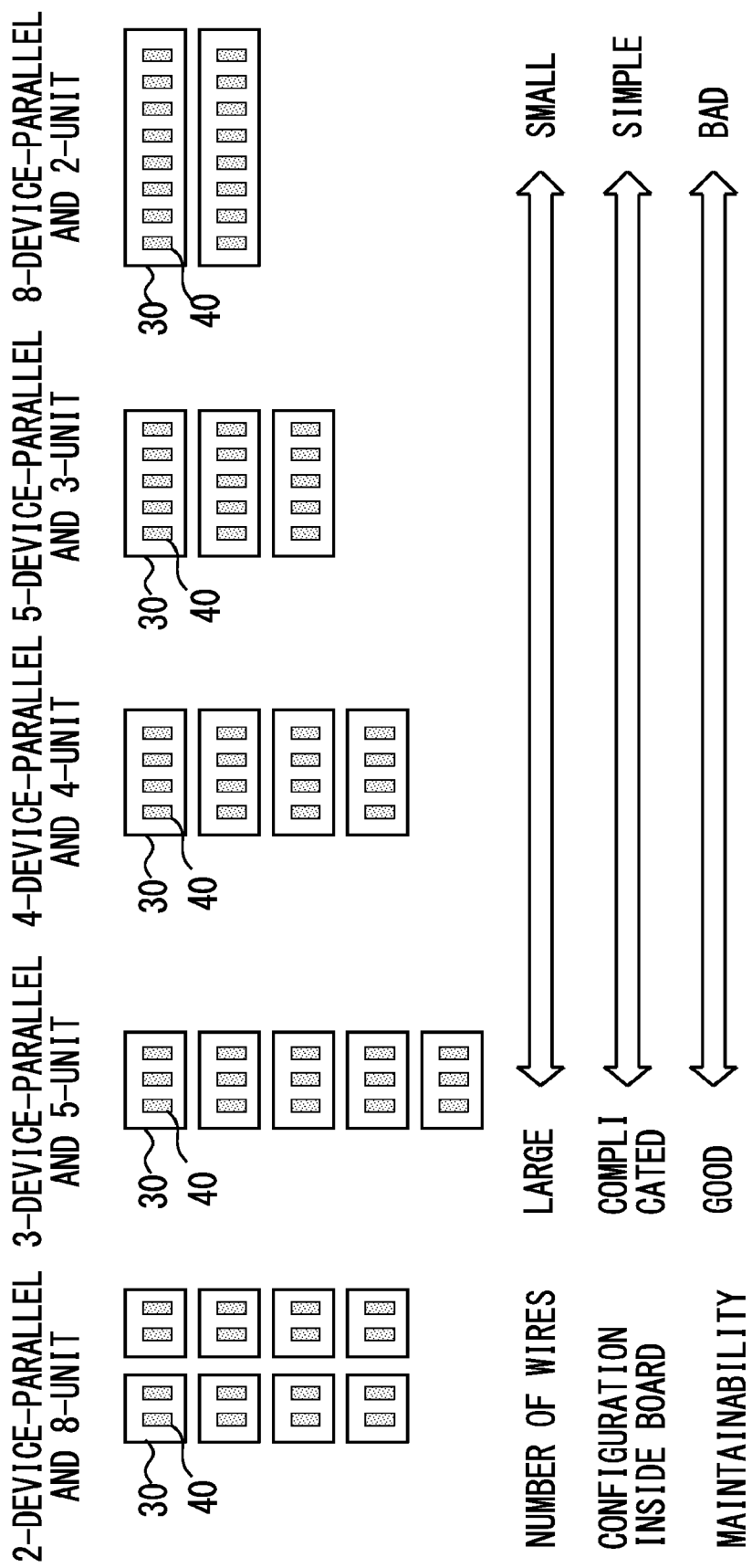
FIG. 6 is a diagram illustrating examples of parallel connection of inverter units and semiconductor devices.

FIG. 6 is a diagram illustrating examples of parallel connection of the inverter units 30 and the semiconductor devices 40. For example, in a case where it is necessary to connect 15 to 16 semiconductor devices 40 in parallel for each phase to achieve the power converter 1 having a larger capacity than the power converter 1 of the basic design, some patterns can be employed as illustrated in FIG. 6.

For example, from the left in FIG. 6, there are a pattern including 16 semiconductor devices 40 connected in parallel as a 2-device-parallel and 8-unit configuration, and a pattern including 15 semiconductor devices 40 connected in parallel as a 3-device-parallel and 5-unit configuration. Further, there are a pattern including 16 semiconductor devices 40 connected in parallel as a 4-device-parallel and 4-unit configuration, and a pattern including 15 semiconductor devices 40 connected in parallel as a 5-device-parallel and 3-unit configuration. Further, there is a pattern including 16 semiconductor devices 40 connected in parallel as an 8-device-parallel and 2-unit configuration.

Each of these patterns has its advantages. For example, in view of the number of wires, when a signal (gate signal) for turning on or off the semiconductor devices 40 is transmitted from a control device (not illustrated), only two wires are required in the 8-device-parallel and 2-unit configuration, that is, when the number of inverter units 30 is only two. On the other hand, eight wires are required in the 2-device-parallel and 8-unit configuration, that is, when the number of inverter units 30 is eight. That is, as the number of inverter units 30 is increased, the number of wires is increased. Further, as the configuration inside the board is divided into smaller sections, the number of metal sheets is increased, and the configuration becomes more complicated.

On the other hand, in terms of maintainability, the inverter unit 30 in the 2-device-parallel and 8-unit configuration can be made smaller and lighter than the inverter unit 30 in the 8-device-parallel and 2-unit configuration. Thus, in terms of maintainability, the inverter unit 30 in the 2-device-parallel and 8-unit is better.

Thus, as described above, these patterns have a trade-off relationship in several factors. In the conventional technique, the capacity of each discrete inverter unit 30 is increased and the number of inverter units 30 is minimized to save labor in wiring and simplify the configuration inside the board. However, in the present invention, as will be described below, by focusing on the property of the DC fuse 6, the capacity of each discrete inverter unit 30 is reduced on purpose, and the number of inverter units 30 is increased on purpose.

FIG. 7 is a diagram illustrating examples of a DC fuse rating. In FIG. 7, the specifications of two fuses are listed. The leftmost column shows a body size, and both of the two fuses have a body size of 30. The next column to the right shows a rated current (ampere rating), and the upper fuse has an ampere rating of 200 (A) and the lower fuse has an ampere rating of 400 (A). The next column to the right shows a rated voltage (voltage rating), and both of the two fuses have a rated voltage of 690 (V). The next column to the right, namely, the fourth column from the left shows a melting $I^2t$. The melting $I^2t$ of the fuse having a rated current of 200 (A) is 3 ($A^2s \times 10^3$), and the melting $I^2t$ of the fuse having a rated current of 400 (A) is 23 ($A^2s \times 10^3$).

The melting $I^2t$ serves as a barometer of a fuse blowout. The fuse is less likely to be blown with a larger melting $I^2t$. As illustrated in FIG. 7, the ampere rating and the melting $I^2t$ are not in a proportional relationship. That is, as illustrated in FIG. 7, when the ampere rating of the fuse doubles from 200 (A) to 400 (A), the melting $I^2t$ increases by a factor of seven or more from 3 ($A^2s \times 10^3$) to 23 ($A^2s \times 10^3$). In other words, when the ampere rating of the fuse is halved from 400 (A) to 200 (A), the melting $I^2t$ can be reduced by a factor of seven or more from 23 ($A^2s \times 10^3$) to 3 ($A^2s \times 10^3$). On the other hand, when the ampere rating of the fuse is 200 (A), the fuse does not blow even if a current of 200 (A) continuously flows.

For example, when the ampere rating of the DC fuse 6 is halved, the DC fuse 6 can be blown many times more quickly. In the present invention, focusing on the property of the DC fuse 6 described above, the DC fuse 6 is blown more quickly by reducing the capacity of each discrete inverter unit 30 on purpose. Note that numerical values in the rightmost and second rightmost columns of the table in FIG. 7 are less relevant to the present invention, and description thereof will thus be omitted.

Figure 8:
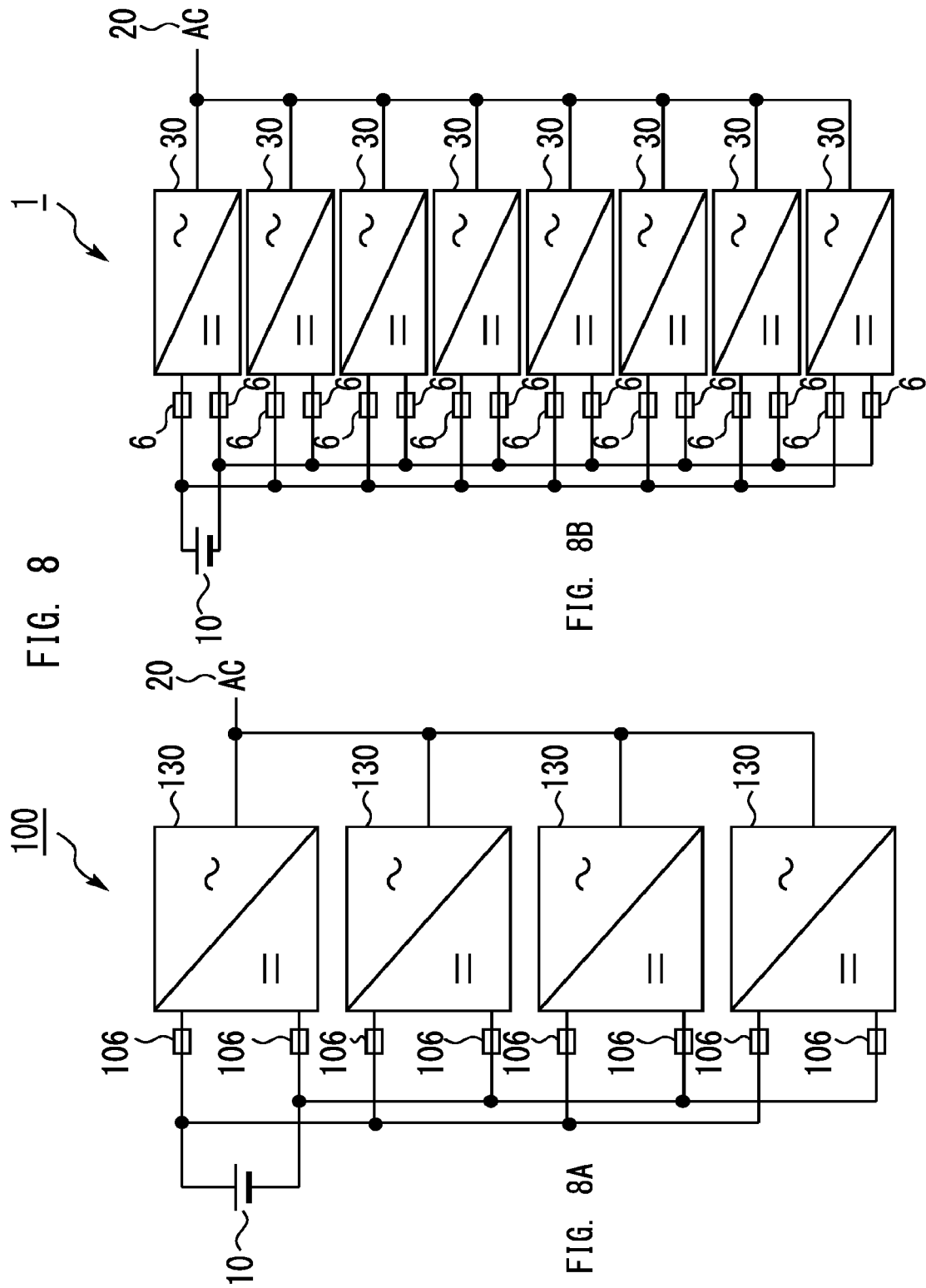
FIG. 8 is a diagram illustrating a configuration example of a conventional power converter according to a comparative example and a configuration example of the power converter according to the embodiment.

FIG. 8 is a diagram illustrating a configuration example of a conventional power converter 100 according to a comparative example and a configuration example of the power converter 1 according to the embodiment. FIG. 8A is diagram illustrating the configuration example of the conventional power converter 100 according to the comparative example. FIG. 8B is a diagram illustrating the configuration example of the power converter 1 according to the embodiment.

Note that, in both of the power converter 100 illustrated in FIG. 8A and the power converter 1 illustrated in FIG. 8B, it is assumed that the number of semiconductor devices 40 is 16.

As illustrated in FIG. 8A, in the conventional power converter 100 according to the comparative example, four inverter units 130 are connected in parallel. Since it is assumed that the number of semiconductor devices 40 is 16, four semiconductor devices 40 are disposed in each of the inverter units 130. A DC fuse 106 having a rated current corresponding to the capacity of the inverter unit 130 is used.

As illustrated in FIG. 8B, in the power converter 1, eight inverter units 30 are connected in parallel. Since it is assumed that the number of semiconductor devices 40 is 16, two semiconductor devices 40 are disposed in each of the inverter units 30. The DC fuse 6 having a rated current corresponding to the capacity of the inverter unit 30 is used.

Comparing the power converter 100 illustrated in FIG. 8A and the power converter 1 illustrated in FIG. 8B, the number of inverter units 30 is double the number of inverter units 130. Thus, the capacity of the inverter unit 30 is half the capacity of the inverter unit 130. Accordingly, in the power converter 1 according to the present embodiment, the ampere rating of the DC fuse 6 can be made half the ampere rating of the DC fuse 106 of the power converter 100 according to the comparative example. As described above with reference to FIG. 7, when the ampere rating of the DC fuse 6 is halved, the melting $I^2t$ indicating easiness of blowout of the fuse decreases to a fraction of its original value. Thus, the DC fuse 6 according to the present embodiment is blown many times more quickly than the DC fuse 106 according to the comparative example.

FIG. 9 is a diagram illustrating an operation example of direct current and DC voltage at the occurrence of a short-circuit failure in the conventional power converter 100 according to the comparative example illustrated in FIG. 8 and an operation example of direct current and DC voltage at the occurrence of a short-circuit failure in the power converter 1 according to the embodiment.

FIG. 9A is a diagram illustrating the operation example of direct current and DC voltage at the occurrence of a short-circuit failure in the conventional power converter 100 according to the comparative example illustrated in FIG. 8A. FIG. 9A is a diagram illustrating the operation example of direct current and DC voltage at the occurrence of a short-circuit failure in a case where the number of parallel inverter units 130 is small (4-device-parallel and 4-unit configuration) as illustrated in FIG. 8A. FIG. 9A illustrates the operation example of direct current and DC voltage at the occurrence of a short-circuit failure in one of the four inverter units 130 connected in parallel. Note that, in the apparatus illustrated in FIG. 9A, the semiconductor device 40 having a device rating of 1700 V is used.

In FIG. 9A, the DC fuse 106 is blown 220 micro seconds after a short-circuit failure occurs. However, the DC voltage jumps after the blowout, and a peak value thereof reaches 3.1 kV. This is because, since the ampere rating of the DC fuse 106 is large (1100 A), the melting I2t is also large, and a time for the DC fuse 106 to blow is long. Accordingly, the DC voltage rises after the blowout of the DC fuse 106.

Note that, in the case of the apparatus illustrated in FIG. 9A, as described above, the semiconductor device 40 having a device rating of 1700 V is used. In this case, there is no problem when the voltage of 3.1 kV is uniformly applied to the upper arms 2 and the lower arms 2 of the other sound semiconductor devices 40. However, at the time of such a fault, the waveform may become unbalanced. In this case, the application of the DC voltage of 3.1 kV may break the semiconductor device 40 due to overvoltage. Thus, in the conventional power converter 100 according to the comparative example, device breakage of the semiconductor device 40 secondarily occurs also in the other sound inverter units 30.

FIG. 9B is a diagram illustrating the operation example of direct current and DC voltage at the occurrence of a short-circuit failure in the power converter 1 according to the embodiment illustrated in FIG. 8B. FIG. 9B is a diagram illustrating the operation example of direct current and DC voltage at the occurrence of a short-circuit failure in a case where the number of parallel inverter units 30 is large (2-device-parallel and 8-unit configuration) as illustrated in FIG. 8B. FIG. 9B illustrates the operation example of direct current and DC voltage at the occurrence of a short-circuit failure in one of the eight inverter units 30 connected in parallel. Note that, in the apparatus illustrated in FIG. 9B, the semiconductor device 40 having a device rating of 1700 V is used as with the apparatus illustrated in FIG. 9A.

In FIG. 9B, the DC fuse 6 is blown immediately after a short-circuit failure occurs. Also, jumping of the DC voltage is 1.47 V, which is small. This is because, since the ampere rating of the DC fuse 6 is small (525 A), the melting $I^2t$ is also small, and a time for the DC fuse 6 to blow is many times shorter than that of the DC fuse 106.

Note that, in the case of the apparatus illustrated in FIG. 9B, as described above, the semiconductor device 40 having a device rating of 1700 V is used. In this case, even if the voltage of 1.47 kV is continuously applied, with an unbalanced waveform, to the upper arms 2 and the lower arms 2 of the other sound semiconductor devices 40, the semiconductor devices 40 are not broken due to overcurrent because the voltage is lower than the device rating. Thus, in the power converter 1 according to the present embodiment, it is possible to reduce secondary device breakage of the semiconductor devices 40 in the other sound inverter units 30.

As illustrated in FIGS. 9A and 9B, if rising of an incoming current from the storage battery 10 can be suppressed, jumping of the DC voltage thereafter can be suppressed. If the incoming current from the storage battery 10 largely rises, an energy is stored in the impedance 7 of the wire between the storage battery 10 and the power converter 1, mainly in an inductance. It is considered that, if a current of I flows through a reactor of an inductance L, that is, an inductor, an energy of $1/2LI^2$ is stored and flows in, which affects jumping of the voltage.

According to the above, the rating of the melting $I^2t$ of the DC fuse 6 in the power converter 1 having the 2-device-parallel and 8-unit configuration can be made many times smaller than that in the power converter 100 having the 4-device-parallel and 4-unit configuration. Thus, the DC fuse 6 is quickly blown, which makes it possible to suppress the rise of the DC voltage. This is due to the blowout characteristics of the DC fuse 6. That is, this is due to the following characteristics. The ampere rating and the melting $I^2t$ of the DC fuse 6 are not in a proportional relationship. When the ampere rating doubles, the melting $I^2t$ may be more than two times. When the ampere rating is halved, the melting I²t may be less than a half. Accordingly, the DC fuse 6 is more quickly blown.

Note that, in order to achieve the large-capacity power converter 1, first, plans of device-parallel/unit-parallel are listed and analyzed in each pattern. There is a tendency that, when the number of parallel inverter units 30 is smaller, the DC fuse 6 blows more slowly, and the DC fuses 6 of the other sound inverter units 30 also blow. In addition, jumping of the DC voltage is also large. At this time, the number of parallel inverter units 30 with which the DC fuses 6 of the other sound inverter units 30 are not blown and jumping of the DC voltage is small is determined. Then, the large-capacity power converter 1 is achieved based on the above determination result.

A case where the large-capacity power converter 1 cannot be achieved corresponds to a case where jumping of the DC voltage is large and the DC fuses 6 of the other sound inverter units 30 are also blown. This is because, when the capacity of the inverter unit 30 is large, the number of parallel inverter units 30 is small, and the number of parallel semiconductor devices 40 in one unit is large. As the size of the inverter unit 30 increases, the melting I²t of one DC fuse 6 increases. Accordingly, the DC fuse is blown slowly, and the fuses of the other sound inverter units 30 are also blown.

Thus, the large-capacity power converter 1 according to the present embodiment requires that the number of inverter units 30 be a number with which a condition that none of the DC fuses 6 of the other sound inverter units 30 are blown is satisfied in a short-circuit analysis. As an example, the number of inverter units 30 is larger than the number of semiconductor devices 40. As another example, the number of inverter units 30 is larger than 4. As still another example, as described in the present embodiment, the number of inverter units 30 is 8, and the number of semiconductor devices 40 is 2.

Effect of the Embodiment

According to the present embodiment, it is possible to provide the power converter 1 that reduces the occurrence of secondary device breakage in the sound inverter unit 30 by immediately blowing the DC fuse 6 when device breakage occurs to suppress rise of the DC voltage (DC link voltage).

Supplemental of Embodiment

Features and advantages of the embodiment will become apparent from the above detailed description. This intends that the claims cover the features and advantages of the embodiment as described above without departing from the spirit and scope thereof. Further, those skilled in the art can easily conceive every improvement and modification. Thus, there is no intention to limit the range of the inventive embodiment to the described one, and appropriate modifications and equivalents falling within the scope disclosed in the embodiment may be resorted to.

REFERENCE SIGNS LIST

1, 1A, 1B, 1C Power converter (inverter)
2 Arm
3 Leg
4 DC capacitor (capacitor)
5 DC circuit breaker (circuit breaker)
6 DC fuse (fuse)
7 Impedance
8 Short-circuit failure (short-circuit fault)
10 DC power supply (storage battery)
20 AC system
30 Inverter unit (unit, discrete inverter unit, discrete unit)
40 Semiconductor device (device)
100 Power converter
106 DC fuse (fuse)
130 Inverter unit (unit, discrete inverter unit, discrete unit)
C Neutral point
L Inductance
N Negative electrode
P Positive electrode

The invention claimed is:

1. A power converter comprising:
a plurality of inverter units connected in parallel to a DC power supply on a DC side, the DC power supply comprising a storage battery, each of the plurality of inverter units including a plurality of semiconductor devices; and
a DC fuse provided in each of current paths between the DC power supply and the plurality of inverter units, the DC fuse being configured to, when a short-circuit failure occurs in any of the plurality of inverter units, be blown in the current path between the DC power supply and the inverter unit having the short-circuit failure, wherein
the number of the plurality of inverter units is a number with which a condition that, when the DC fuse between the DC power supply and the inverter unit having the short-circuit failure is blown, none of a plurality of the DC fuses between the DC power supply and a plurality of other inverter units that do not have the short-circuit failure are blown is satisfied,
the number of the plurality of inverter units is larger than the number of the plurality of semiconductor devices, and
the number of the plurality of inverter units is 8, and the number of the plurality of semiconductor devices is 2.

* * * * *